United States Patent Office.

BETHEL BURTON, OF BROOKLYN, NEW YORK.

Letters Patent No. 81,057, dated August 11, 1868.

IMPROVEMENT IN THE MANUFACTURE OF WATER-PROOF PERCUSSION-CAPS, &c.

*The Schedule referred to in these Letters Patent and making part of the same.*

TO ALL WHOM IT MAY CONCERN:

Be it known that I, BETHEL BURTON, of the city of Brooklyn, county of Kings, and State of New York, have invented a new and improved Mode of Compounding Combustible Matter, to be Ignited by Percussion, Concussion, or Friction; and I do hereby declare that the following is a full, clear, and exact description thereof.

The nature of my invention consists in rendering said compound water-proof, and which is not injured by coming in contact with oil or greasy matter, nor by exposure for any length of time to the atmosphere.

To enable others skilled in the art to make and use my invention, I will proceed to describe the method of compounding it.

I take shellac dissolved in alcohol, with which I mix amorphous phosphorus and chlorate of potash; sulphur and charcoal may be added if desired. The quantity of shellac used should be sufficient to unite the other materials, so that when it is applied for use, and dry, it becomes hard, and will resist the action of the atmosphere, oil, or grease.

I do not confine myself to these ingredients. Other fulminating-compounds may be used, and, when mixed with shellac, are preserved in like manner.

What I claim as my invention, and desire to secure by Letters Patent, is—

The use of shellac or other gum-resin mixed with alcohol or other readily-evaporable liquid solvent, in compounding fulminating-matter, which serves the purpose of rendering it impervious to damp or wet, and indestructible by coming in contact with oil or grease, and which will preserve it from the action of the atmosphere in all climates, and for use in all purposes where ignition by friction, percussion, or concussion is required, as specified.

BETHEL BURTON.

Witnesses:
 WINGFIELD G. BURTON,
 HENRY C. BURTON.